(12) United States Patent
Putzig

(10) Patent No.: US 7,851,417 B2
(45) Date of Patent: *Dec. 14, 2010

(54) PROCESS TO PREPARE BOROZIRCONATE SOLUTION AND USE AS CROSS-LINKER IN HYDRAULIC FRACTURING FLUIDS

(75) Inventor: Donald Edward Putzig, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 181 days.

This patent is subject to a terminal disclaimer.

(21) Appl. No.: 12/001,630

(22) Filed: Dec. 11, 2007

(65) Prior Publication Data

US 2009/0149355 A1    Jun. 11, 2009

(51) Int. Cl.
  C01B 35/04    (2006.01)
  C01G 23/00    (2006.01)
  C01G 25/00    (2006.01)
  C09K 8/60     (2006.01)
  E21B 33/13    (2006.01)
  E21B 43/26    (2006.01)

(52) U.S. Cl. .................. 507/271; 166/285; 166/292; 166/295; 166/308.5; 423/69; 423/297; 507/211; 507/214; 507/273

(58) Field of Classification Search ............... 507/273, 507/214, 215, 216, 271; 423/69, 275
See application file for complete search history.

(56) References Cited

U.S. PATENT DOCUMENTS

| | | |
|---|---|---|
| 5,165,479 A | 11/1992 | Harris et al. |
| 5,217,632 A | 6/1993 | Sharif |
| 5,271,466 A | 12/1993 | Harms |
| 5,558,161 A | 9/1996 | Vitthal et al. |
| 5,806,597 A | 9/1998 | Tjon-Joe-Pin et al. |
| 5,950,731 A | 9/1999 | Shuchart et al. |
| 6,186,235 B1 | 2/2001 | Tjon-Joe-Pin et al. |
| 6,214,773 B1 | 4/2001 | Harris et al. |
| 6,454,008 B1 | 9/2002 | Chatterji et al. |
| 6,488,091 B1 | 12/2002 | Weaver et al. |
| 6,613,720 B1 | 9/2003 | Feraud et al. |
| 6,734,146 B2 | 5/2004 | Chatterji et al. |
| 6,793,018 B2 | 9/2004 | Dawson et al. |
| 6,810,959 B1 | 11/2004 | Qu et al. |
| 6,814,145 B2 | 11/2004 | Maberry et al. |
| 6,818,598 B2 | 11/2004 | Maberry et al. |
| 6,918,445 B2 | 7/2005 | Todd et al. |
| 6,971,448 B2 | 12/2005 | Slabaugh et al. |
| 6,983,801 B2 | 1/2006 | Dawson et al. |
| 7,001,872 B2 | 2/2006 | Pyecroft et al. |
| 7,036,590 B2 | 5/2006 | Harris |
| 2003/0092584 A1 | 5/2003 | Crews |
| 2003/0114539 A1 | 6/2003 | Weaver et al. |
| 2004/0238169 A1 | 12/2004 | Todd et al. |
| 2005/0065038 A1 | 3/2005 | Weaver et al. |
| 2005/0065040 A1 | 3/2005 | Weaver et al. |
| 2005/0137094 A1 | 6/2005 | Weaver et al. |
| 2005/0178553 A1 | 8/2005 | Harris |
| 2005/0269099 A1 | 12/2005 | Stegent et al. |
| 2005/0284637 A1 | 12/2005 | Stegent et al. |
| 2006/0009363 A1 | 1/2006 | Crews |
| 2006/0030493 A1 | 2/2006 | Segura |
| 2006/0032636 A1 | 2/2006 | Lord et al. |
| 2008/0280788 A1 * | 11/2008 | Parris et al. ............ 507/211 |
| 2009/0156434 A1 * | 6/2009 | Putzig ................. 507/240 |

FOREIGN PATENT DOCUMENTS

JP    2005126672    5/2005

OTHER PUBLICATIONS

Dey et al., Metallic complexes as ligands: Part II—Nickel(II) complex of the Schiff base derived frim 3-formylsalicylic acid and ethylenediamine as ligand for titanium, zirconium, tin, phosphorus, and boron; Indian Journal of chemistry, Section A: Inorganic, Physical, Theoretical & Analytical (1981), 20A(3), 848-861. Abstract.

Reger et al., Poly(pyrazolyl)borate Complexes of Zirconium(IV); Inorganic Chemistry (1982), 21(2), 840-842.

Ashe et al., Conformational Properties of Boron-Bridged Dimethylethylenediamino Bis(boratabenzene) Zirconium(IV) and Iron (II) Complexes; Organomatallics (2001), 20(3), 456-473; American Chemical Society.

* cited by examiner

Primary Examiner—Timothy J. Kugel
(74) Attorney, Agent, or Firm—Kathryn M. Sanchez

(57) ABSTRACT

A process to prepare a stable solution of a borozirconate complex is disclosed and use of the solution in oil field applications such as hydraulic fracturing and plugging of permeable zones. The process comprises contacting zirconium complex with alkanolamine, then glycerol and water, then with a boron compound. The solution is particularly suitable for use in a cross-linking composition in hydraulic fracturing and plugging of permeable zones of subterranean formations at temperatures of 275° F. (135° C.) and higher in the formation.

17 Claims, No Drawings

PROCESS TO PREPARE BOROZIRCONATE SOLUTION AND USE AS CROSS-LINKER IN HYDRAULIC FRACTURING FLUIDS

FIELD OF THE INVENTION

The present invention relates to borozirconate compositions and their use in oil field applications such as hydraulic fracturing and plugging of permeable zones.

BACKGROUND OF THE INVENTION

The production of oil and natural gas from an underground well (subterranean formation) can be stimulated by a technique called hydraulic fracturing, in which a viscous fluid composition (fracturing fluid) containing a suspended proppant (e.g., sand, bauxite) is introduced into an oil or gas well via a conduit, such as tubing or casing, at a flow rate and a pressure which create, reopen and/or extend a fracture into the oil- or gas-containing formation. The proppant is carried into the fracture by the fluid composition and prevents closure of the formation after pressure is released. Leak-off of the fluid composition into the formation is limited by the fluid viscosity of the composition. Fluid viscosity also permits suspension of the proppant in the composition during the fracturing operation. Cross-linking agents, such as borates, titanates or zirconates, are usually incorporated into the fluid composition to control viscosity.

Typically, less than one third of available oil is extracted from a well after it has been fractured before production rates decrease to a point at which recovery becomes uneconomical. Enhanced recovery of oil from such subterranean formations frequently involves attempting to displace the remaining crude oil with a driving fluid, e.g., gas, water, brine, steam, polymer solution, foam, or micellar solution. Ideally, such techniques (commonly called flooding techniques) provide a bank of oil of substantial depth being driven into a producing well; however, in practice this is frequently not the case. Oil-bearing strata are usually heterogeneous, some parts of them being more permeable than others. As a consequence, channeling frequently occurs, so that the driving fluid flows preferentially through permeable zones depleted of oil (so-called "thief zones") rather than through those parts of the strata which contain sufficient oil to make oil-recovery operations profitable.

Difficulties in oil recovery due to thief zones may be corrected by injecting an aqueous solution of an organic polymer and a cross-linking agent into a subterranean formation under conditions where the polymer will be cross-linked to produce a gel, thus reducing permeability of the subterranean formation to the driving fluid (gas, water, etc.). Polysaccharide- or partially hydrolyzed polyacrylamide-based fluids cross-linked with certain aluminum, titanium, zirconium, and boron based compounds are used in these enhanced oil recovery applications. Cross-linked fluids or gels, whether for fracturing a subterranean formation or for reducing permeability of zones in subterranean formation, are now being used in hotter and deeper wells under a variety of temperature and pH conditions. In these operations the rate of cross-linking is critical to the successful generation of viscosity.

Boron-based compounds are typically used as cross-linkers in fracturing fluids utilized in low to mid temperature wells (150-250° F., 66-121° C.). Cross-linking takes place immediately on mixing of the boron compound with the polymer base-gel. A pH of 10 or greater is required to initiate cross-linking with boron-based cross-linkers. Because boron cross-linked gels are not shear sensitive, they can be used, even though they cross-link at or near the surface.

Existing delayed zirconium-based cross-linkers, based on triethanolamine or hydroxyalkylated ethylenediamine have been designed to initiate cross-linking in the wellbore. Therefore, they are ineffective at generating viscosity under mild surface temperature conditions. The gels are also shear sensitive and require higher horsepower (energy consumption) to pump.

The need exists in some fracturing fluid applications to generate an initial viscosity at the surface, followed by a delayed viscosity generation, once the fluid is subjected to higher down-hole temperatures. Current technology involves using a borate ion generating material in combination with a delayed zirconate cross-linker to accomplish both surface and delayed viscosity development. However, borate/zirconate cross-linking compositions suffer from disadvantages, such as, poor shelf stability, insufficient viscosity generation and undesirable cross-linking rates.

U.S. Pat. No. 6,214,773 discloses a fracturing fluid comprising water, a hydrated gelling agent, and a retarded cross-linker comprising a liquid solvent comprising a mixture of water, triethanolamine, a polyhydroxy compound and isopropyl alcohol; an organic titanate or zirconate chelate and a borate ion producing compound. Fracturing fluids cross-link too slowly and do not generate adequate viscosity to successfully complete a fracturing application in the hotter (275° F., 135° C.) deeper wells.

There is a need for a borozirconate cross-linker which is stable on storage and is capable of generating excellent viscosity in the desired 3-8 minute range, and which can be used in place of existing delayed zirconate cross-linkers in areas where an initial surface viscosity development is required, or in place of delayed borate cross-linkers, which have limited temperature application. The present invention meets these needs.

SUMMARY OF THE INVENTION

The present invention provides a process to prepare a solution of borozirconate complex, which solution is suitable for use in a cross-linking composition used as a fracturing fluid. The process comprises: (a) contacting a zirconium complex with alkanolamine at a mole ratio of 1 to 10 moles of alkanolamine to zirconium in an alcohol to form a first mixture; (b) contacting the first mixture with glycerol and water at a mole ratio of about 0.1 to 1 moles of glycerol per mole of zirconium and a mole ratio of about 1 to 12 moles of water per mole of zirconium, to produce a second mixture; (c) contacting the second mixture with a boron compound at a mole ratio of about 1 to 6 moles of boron per mole of zirconium and at a temperature of 25° C. to 90° C. to produce a solution comprising a borozirconate complex.

The present invention further provides a cross-linking composition comprising the solution of the borozirconate complex prepared according to the process of this invention and a method to use the cross-linking composition as a fracturing fluid.

DETAILED DESCRIPTION OF THE INVENTION

Trademarks and tradenames are shown herein in upper case.

This invention provides a solution of borozirconate complex suitable for use in a fracturing fluid. The borozirconate complex may be in the form of a single or multiple borozirconate species in solution. The borozirconate is stable as a solution in alcohol upon storage and is capable of generating excellent viscosity in the desired 3-8 minute range. By "stable" it is meant a solution comprising borozirconate complex prepared according to the process of this invention can be stored at ambient temperature for at least six months without precipitation. The borozirconate solution can be advantageously used in place of known delayed zirconate cross-linkers in areas where an initial surface viscosity development is required, or in place of delayed borate cross-linkers, which have limited temperature application.

The solution of borozirconate complex of this invention is produced by a process comprising: (a) contacting a zirconium complex with alkanolamine at a mole ratio of 1 to 10 moles of alkanolamine to zirconium in an alcohol to form a first mixture; (b) contacting the first mixture with glycerol and water at a mole ratio of about 0.1 to 1 moles of glycerol per mole of zirconium and a mole ratio of about 1 to 12 moles of water per mole of zirconium, to produce a second mixture; (c) contacting the second mixture with a boron compound at a mole ratio of about 1 to 6 moles of boron per mole of zirconium and at a temperature of 25° C. to 90° C. to produce a solution comprising a borozirconate complex. Contact times should be sufficient for reactions to complete, and so that the product solution is stable upon storage.

In step (a), an alcoholic solution of a zirconium alkanolamine complex can be prepared by contacting a solution of a tetraalkyl zirconate in a $C_1$-$C_6$ alcohol with from 1 to 10 moles of an alkanolamine per mole of zirconium. Preferably this ratio is from 2 to 6 moles of alkanolamine per mole of zirconium.

A number of tetraalkyl zirconates (also known as zirconium tetraalkoxides) can be used to prepare the above zirconium complex, e.g., tetra-isopropyl zirconate, tetra-n-propyl zirconate, and tetra-n-butyl zirconate. The preferred tetraalkyl zirconate is tetra-n-propyl zirconate, available as TYZOR NPZ organic zirconate, a solution in n-propanol, with a zirconium content, as $ZrO_2$, of about 28% by weight, and available from E. I. du Pont de Nemours and Company, Wilmington, Del.

Examples of suitable alkanolamines include, but are not limited to, triethanolamine, tripropanolamine, tri-isopropanolamine, diisopropanolamine, and mixtures of two or more thereof. Preferably the alkanolamine is triethanolamine.

Contacting the above tetraalkyl zirconates with the alkanolamine can be carried out at a variety of temperatures, typically between 25° C. and 90° C., preferably between 50° C. and 80° C., and in any order. The first mixture is then held at this temperature for a sufficient period to reach equilibrium. Equilibrium is, that is, completion of reactions. A contact time of about 2 hours at 60° C. is adequate, but other periods and temperatures may also be used.

In step (b), the first mixture is contacted with glycerol and water. Glycerol is added in an amount sufficient to provide about 0.1 to 1 moles of glycerol per mole of zirconium. Water is added in an amount to provide about 1 to 12 moles of water per mole of zirconium. The second mixture is then held at a temperature between 25° C. and 90° C. for a period of time sufficient to reach equilibrium. A contact time of about 2 hours at 60° C. is adequate, but other periods and temperatures may also be used.

In step (c), the second mixture is contacted with a boron compound. The boron compound is added in an amount sufficient to provide about 1 to 6 moles of boron per mole of zirconium. The boron compound can be selected from the group consisting of boric acid, alkali metal borates, alkaline earth metal borates, polymeric borate compounds and the like. Alkali metals are typically lithium and sodium. Alkaline earth metals are typically magnesium and calcium. Preferably the boron compound is boric acid.

The reaction mixture in step (c) is held at a temperature of 25° C. to 90° C. for a period of time sufficient to stabilize the resulting solution. As stated hereinabove, by "stable" it is meant a solution comprising the borozirconate complex can be stored at ambient temperature for at least six months without precipitation. A contact time of about 2 hours at 60° C. is adequate, but other periods and temperatures may also be used.

The process of this invention is performed in an alcohol solvent. The solvent is typically an alcohol having 1 to 6 carbon atoms. Typically the solvent is methanol, isopropanol, or n-propanol. Preferably the alcohol is methanol.

The present invention also provides a cross-linking composition which comprises (a) an aqueous liquid; (b) a pH buffer; (c) a cross-linkable organic polymer; and (d) a borozirconate solution prepared by a process which comprises: (1) contacting a zirconium complex with triethanolamine at a mole ratio of 1 to 10 moles of triethanolamine to zirconium in an alcohol to form a first mixture; (2) contacting the first mixture with glycerol and water at a mole ratio of about 0.1 to 1 moles of glycerol per mole of zirconium and a mole ratio of about 1 to 12 moles of water per mole of zirconium, to produce a second mixture; (3) contacting the second mixture with a boron compound at a mole ratio of about 1 to 6 moles of boron per mole of zirconium and at a temperature of 25° C. to 90° C. to produce a solution comprising a borozirconate complex.

The aqueous liquid (a) is typically selected from the group consisting of water, aqueous alcohol, and aqueous solution of a clay stabilizer. The alcohol can be the same or different alcohol as the reaction solvent, that is, an alcohol having 1 to 6 carbon atoms. Preferably, when the aqueous liquid is aqueous alcohol, the alcohol is methanol or ethanol. Clay stabilizers include, for example, hydrochloric acid and chloride salts, such as, tetramethylammonium chloride (TMAC) or potassium chloride. Aqueous solutions comprising clay stabilizers may comprise, for example, 0.05 to 0.5 weight % of the stabilizer, based on the combined weight of the aqueous liquid and the organic polymer (i.e., the base gel). Preferably, when the aqueous liquid is an aqueous solution of a clay stabilizer, the clay stabilizer is tetramethylammonium chloride or potassium chloride.

The aqueous liquid can also be a mixture of water and one or more organic solvents. Organic solvents that may be used include alcohols, glycols, polyols, and hydrocarbons such as diesel.

Preferably, the aqueous liquid is water, aqueous methanol, aqueous ethanol, an aqueous solution of potassium chloride, an aqueous solution of tetramethylammonium chloride, or a combination of two or more thereof.

The cross-linking composition comprises an effective amount of a pH buffer (b) to control pH. The pH buffer may be acidic, neutral or basic. The pH buffer is generally capable of controlling the pH from about pH 5 to about pH 12. For example in a composition for use at a pH of 5-7, a fumaric acid-based buffer or a sodium diacetate-based buffer can be used. In a composition for use at a pH of 7-8.5, a sodium bicarbonate-based buffer can be used. In a composition for use at a pH of 9-12, a sodium carbonate or sodium hydroxide-based buffer can be used. Other suitable pH buffers can be used, as are known to those skilled in the art.

The composition further comprises a cross-linkable organic polymer (c). Suitable cross-linkable organic polymers are selected from the group consisting of solvatable polysaccharides, polyacrylamides and polymethacrylamides.

Preferably the organic polymer is a solvatable polysaccharide and is selected from the group consisting of gums, gum derivatives and cellulose derivatives. Gums include guar gum and locust bean gum, as well as other galactomannan and glucomannan gums, such as those derived from sennas, Brazilwood, tera, honey locust, karaya gum and the like. Preferred gum derivatives include hydroxyethylguar (HEG), hydroxypropylguar (HPG), carboxyethylhydroxyethylguar (CEHEG), carboxymethylhydroxypropylguar (CMHPG), and carboxymethyl guar (CMG). Preferred cellulose derivatives include those containing carboxyl groups, such as carboxymethylcellulose (CMC) and carboxymethylhydroxyethylcellulose (CMHEC). The solvatable polysaccharides can be used individually or in combination; usually, however, a single material is used. Guar derivatives and cellulose derivatives are preferred, such as, HPG, CMC and CMHPG. HPG is generally more preferred based upon its commercial availability and desirable properties. However, CMC and CMHPG may be more preferred in cross-linking compositions when the pH of the composition is less than 6.0 or higher than 9.0, or when the permeability of the formation is such that one wishes to keep the residual solids at a low level to prevent damage to the formation. The cross-linkable polymer is normally mixed with the aqueous liquid to form a base gel.

The solution of borozirconate complex (d) is an alcohol solution of a borozirconate complex, which solution is prepared by the process described hereinabove.

The cross-linking composition may comprise optional components, including those which are common additives for oil field applications. Thus, the composition may further comprise one or more of proppants, friction reducers, bactericides, hydrocarbons, chemical breakers, polymer stabilizers, surfactants, formation control agents, and the like. Proppants include sand, bauxite, glass beads, nylon pellets, aluminum pellets and similar materials. Friction reducers include polyacrylamides. Hydrocarbons include diesel oil. Chemical breakers break the cross-linked polymer (gel) in a controlled manner and include enzymes, alkali metal persulfate, and ammonium persulfate. Polymer stabilizers include methanol, alkali metal thiosulfate, and ammonium thiosulfate.

These optional components are added in an effective amount sufficient to achieve the desired cross-linking performance based on the individual components, desired cross-linking time, temperature and other conditions present in the formation being fractured or permeable zone being plugged.

The cross-linking composition is produced by mixing the solution of the borozirconate complex with the other components, in any order. For example, in one particular application in an oil field, the solution of borozirconate complex and optional components are introduced into a formation, while the cross-linkable organic polymer and aqueous liquid are introduced into the formation as a separate stream. Alternatively, all components may be premixed and introduced into a subterranean formation as a single stream. Advantageously, the components may be mixed in different combinations, and more advantageously, the components may be mixed just prior to use to enable easy variation and adjustment of the cross-linking rate.

This invention provides a method for hydraulically fracturing a subterranean formation, which comprises introducing into the formation at a flow rate and pressure sufficient to create, reopen, and/or extend one or more fractures in the formation, a cross-linking composition comprising an aqueous liquid; a pH buffer; a cross-linkable organic polymer; and a solution of a borozirconate complex wherein the solution is prepared by a process comprising (a) contacting a zirconium complex with triethanolamine at a mole ratio of 1 to 10 moles of triethanolamine to zirconium in an alcohol to form a first mixture; (b) contacting the first mixture with glycerol and water at a mole ratio of about 0.1 to 1 moles of glycerol per mole of zirconium and a mole ratio of about 1 to 12 moles of water per mole of zirconium, to produce a second mixture; (c) contacting the second mixture with a boron compound at a mole ratio of about 1 to 6 moles of boron per mole of zirconium and at a temperature of 25° C. to 90° C. to produce a solution comprising a borozirconate complex.

In one embodiment of the method for hydraulically fracturing a subterranean formation, the solution of borozirconate complex and the cross-linkable polymer are contacted prior to their introduction into the formation, such that the cross-linking agent and polymer react to form a cross-linked gel. The gel is then introduced into the formation at a flow rate and pressure sufficient to create, reopen, and/or extend a fracture in the formation.

In this method, a base gel is prepared by mixing a cross-linkable organic polymer with an aqueous liquid. Then the cross-linked gel composition is prepared by mixing the base gel with a solution of the borozirconate complex described previously, and made by a method comprising contacting an alcoholic solution of a zirconium complex of an alkanolamine with glycerol and water and then a boron compound in alcohol at a temperature of 25° C. to 90° C. for a period of time sufficient to stabilize the resulting solution, wherein in the process to prepare the solution of the borozirconate complex, 1 to 10 moles of triethanolamine is added per mole of zirconium, 0.1 to 1 mole of glycerol is added per mole of zirconium, 1 to 12 moles of water is added per mole of zirconium, and 1 to 6 moles of boron compound is added per mole of zirconium. The solution of borozirconate complex, the base gel, or both may further comprise a pH buffer.

Alternatively, the subterranean formation may be penetrated by a wellbore, such that contacting the solution of borozirconate complex with the base gel occurs in the wellbore and the cross-linked gel is introduced into the formation from the wellbore. This method of hydraulically fracturing a subterranean formation penetrated by a wellbore comprises (a) preparing a base gel by mixing a cross-linkable organic polymer with an aqueous liquid; (c) introducing the base gel into the wellbore; (d) simultaneously with or sequentially after introducing the base gel into the wellbore, introducing the solution of borozirconate complex described previously, which is made by a process comprising contacting an alcoholic solution of a zirconium complex of an alkanolamine with glycerol and water and then a boron compound in alcohol at a temperature of 25° C. to 90° C. for a period of time sufficient to stabilize the resulting solution, wherein 1 to 10 moles of triethanolamine is added per mole of zirconium, 0.1 to 1 mole of glycerol is added per mole of zirconium, 1 to 12 moles of water is added per mole of zirconium, and 1 to 6 moles of boron compound is added per mole of zirconium; (e) permitting the base gel and the solution of borozirconate complex to react to form a cross-linked aqueous gel; and (f) introducing the cross-linked gel into the formation from the wellbore at a flow rate and pressure sufficient to create, reopen, and/or extend a fracture in the formation. A pH buffer is independently admixed with the base gel, the solution of zirconium complex or both prior to introducing the base gel and the borozirconate solution into the wellbore.

Upon creation of a fracture or fractures, the method may further comprise introducing a cross-linking composition comprising the solution of borozirconate complex, a cross-linkable organic polymer and proppant into the fracture or fractures. This second introduction of a solution of borozirconate complex is preferably performed in the event the cross-linking composition used to create the fracture or fractures did not comprise proppant.

Another use for the solution of borozirconate complex of the present invention relates to a method for selectively plugging permeable zones and leaks in subterranean formations which comprises introducing into the permeable zone or the site of the subterranean leak, a cross-linking composition comprising (a) an aqueous liquid; (b) a pH buffer, (c) a cross-linkable organic polymer; and (d) an aqueous solution of the borozirconate complex described previously. The pH buffer may be admixed with the solution of borozirconate complex prior to introducing the cross-linking composition into the permeable zone or site of the leak.

In a first embodiment of the method for plugging a permeable zone or a leak in a subterranean formation, the aqueous liquid, pH buffer, cross-linkable organic polymer and the solution of borozirconate complex are contacted prior to their introduction into the subterranean formation, such that the polymer and borozirconate complex react to form a cross-linked aqueous gel, which gel is then introduced into the formation.

In an alternative embodiment of the method for plugging a permeable zone or a leak in a subterranean formation, the solution of borozirconate complex and the cross-linkable organic polymer are introduced separately, either simultaneously or sequentially, into the permeable zone or the site of the subterranean leak such that cross-linking occurs within the subterranean formation. This method comprises (a) preparing a base gel by mixing a cross-linkable organic polymer with an aqueous liquid; (b) introducing the base gel into the into the permeable zone or the site of the subterranean leak, (d) simultaneously with or sequentially after, introducing the base gel into the into the permeable zone or the site of the subterranean leak, introducing the solution of borozirconate complex into the permeable zone or the site of the subterranean leak; (e) permitting the base gel and the cross-linking agent to react to form a cross-linked aqueous gel to plug the zone and/or leak. The solution of borozirconate complex, the base gel, or both further comprise a pH buffer.

The relative amounts of cross-linkable organic polymer and the borozirconate complex may vary. One uses small but effective amounts which for both will vary with the conditions, e.g., the type of subterranean formation, the depth at which the method (e.g., fluid fracturing, permeable zone plugging or leak plugging) is to be performed, temperature, pH, etc. Generally one uses as small an amount of each component as will provide the viscosity level necessary to effect the desired result, i.e., fracturing of the subterranean formation, or plugging permeable zones or leaks to the extent necessary to promote adequate recovery of oil or gas from the formation.

For example, satisfactory gels can generally be made for fluid fracturing by using the cross-linkable organic polymer in amounts up to about 1.2 weight % and the cross-linking composition in amounts up to about 0.50 weight % of the borozirconate complex, with percentages being based on the total weight of the cross-linking composition. Preferably, from about 0.25 to about 0.75 weight % of the cross-linkable organic polymer is used and from about 0.05 to about 0.25 weight % of the borozirconate complex is used.

In a method for plugging permeable zones or leaks, generally about 0.25 to 1.2 weight % of a cross-linkable organic polymer is used, preferably 0.04 to 0.75 weight %, based on the total weight of the cross-linking composition. Generally about 0.01 to 0.50 weight % of the borozirconate complex is used, preferably 0.05 to 0.25 weight %, based on the total weight.

The amount of borozirconate complex used to cross-link the organic polymer is that which provides a zirconium ion concentration in a range from about 0.0005 weight % to about 0.1 weight %, based on the total weight of the cross-linking composition. The preferred concentration of zirconium ion is in the range of from about 0.001-0.05 weight %, based on the total weight.

Typically the solution of borozirconate complex of this invention can be used at a pH of from about 8 to 11. Advantageously, the solution of borozirconate complex of this invention is used in the method for hydraulically fracturing a subterranean formation or for plugging a permeable zone at a temperature of 275-325° F. (135-163° C.) in the formation. For successful completion of the fracturing operation, whether hydraulic fracturing or plugging a permeable zone, the cross-linking composition should provide a viscosity of at least 200 Cp, preferably at least 200 Cp, 90 minutes after introducing the cross-linking composition into the subterranean formation or permeable zone or site of a subterranean leak.

EXAMPLES

The preparation of the compositions in the Examples and in the Controls were each carried out in closed vessels containing an agitator, thermometer, condenser, nitrogen inlet and dropping funnel. Unless specified otherwise, percentages are given by weight. Temperatures are given in degrees Celsius. The cross-linking properties of the compositions of this invention are given in the Examples as a function of the viscosity of carboxymethyl, hydroxypropylguar cross-linked with the borozirconate solution of this invention.

Preparation of Base Gel

A Waring blender jar was filled with 1 liter of distilled water. To this was added 2 g of a 50% aqueous solution of tetramethylammonium chloride clay stabilizer. Agitation was started and 3.6 g of carboxymethylhydroxypropylguar (CM-HPG) was sprinkled into the vortex of the agitating solution. The pH of the resultant slurry was adjusted to 6 with sodium diacetate and agitation continued for 30 minutes. The pH was then adjusted to 10.3 with 10% sodium hydroxide solution. Agitation was stopped and the gel was allowed to stand for 30 minutes or more before use.

Viscosity Measurement of Borozirconate Cross-linked Base Gel

To 250 ml of a vigorously agitated sample of base gel in a Waring blender jar, was added 0.00032 moles of zirconium (0.2-1.0 ml dependent on percent borozirconate of cross-linker solution—hereinafter referred to as the Standard Loading Density) for each of the Comparative Examples A-J and Examples 1-8. Agitation was continued for about 15-180 seconds. A 25-ml sample of the cross-linker containing gel was placed in the cup of the FANN 50 Viscometer with an R-1, B-3 configuration and viscosity was measured at 275° F. (135° C.) and 122 rpm at 100 reciprocal seconds of shear.

The following Comparative Examples are based on the range of ingredient ratios disclosed in U.S. Pat. No. 6,214,773. For comparison purposes, testing conditions used to determine cross-linking efficiency were the same as used in the test conditions for the inventive borozirconate complexes. The testing conditions differ slightly from those used in U.S. Pat No. 6,214,773, particularly in test temperature (275° F. instead of 250° F., 135° C., rather than 121° C.).

Comparative Example A

A 500 ml flask equipped with an agitator, condenser and dropping funnel was charged with 32 g of distilled water. Agitation was started and 42.6 g of triethanolamine, 117.2 g of glycerol, 21.3 g of isopropyl alcohol and 9 g of boric acid were added. The resulting mixture was stirred until the boric acid dissolved. The mixture was then transferred to a clean dropping funnel. Then, a clean 500 ml flask was charged with 78 g of tetra-triethanolamine zirconate (TYZOR TEAZ organic zirconate). Agitation was started; the zirconate was heated to 60° C. The boric acid mixture was added dropwise to the zirconate. The combined mixture was held at 60° C. for an additional 2 hours and then cooled to room temperature to give 282 g of a pale yellow liquid containing 3.47% Zr.

Comparative Example B

A 500 ml flask equipped with an agitator, condenser and dropping funnel was charged with 21.3 g of distilled water. Agitation was started and 53.3 g of triethanolamine, 117.2 g of glycerol, 21.3 g of isopropyl alcohol and 9 g of boric acid were added. The resulting mixture was stirred until the boric acid dissolved. The mixture was then transferred to a clean dropping funnel. Then, a clean 500 ml flask was charged with 78 g of tetra-triethanolamine zirconate (TYZOR TEAZ organic zirconate). Agitation was started; the zirconate was heated to 60° C. The boric acid mixture was added dropwise to the zirconate. The combined mixture was held at 60° C. for an additional 2 hours and then cooled to room temperature to give 280 g of a pale yellow liquid containing 3.47% Zr.

Comparative Example C

A 500 ml flask equipped with an agitator, condenser and dropping funnel was charged with 10.7 g of distilled water. Agitation was started and 63.9 g of triethanolamine, 117.2 g of glycerol, 21.3 g of isopropyl alcohol and 9 g of boric acid were added. The resulting mixture was stirred until the boric acid dissolved. The mixture was then transferred to a clean dropping funnel. Then, a clean 500 ml flask was charged with 78 g of tetra-triethanolamine zirconate (TYZOR TEAZ organic zirconate). Agitation was started; the zirconate was heated to 60° C. The boric acid mixture was added dropwise to the zirconate. The combined mixture was held at 60° C. for an additional 2 hours and then cooled to room temperature to room temperature to give 284 g of a pale yellow liquid containing 3.47% Zr.

Comparative Example D

A 500 ml flask equipped with an agitator, condenser and dropping funnel was charged with 21.3 g of distilled water. Agitation was started and 42.6 g of triethanolamine, 106.6 g of glycerol, 42.6 g of isopropyl alcohol and 9 g of boric acid were added. The resulting mixture was stirred until the boric acid dissolved. The mixture was then transferred to a clean dropping funnel. Then, a clean 500 ml flask was charged with 78 g of tetra-triethanolamine zirconate (TYZOR TEAZ organic zirconate). Agitation was started; the zirconate was heated to 60° C. The boric acid mixture was added dropwise to the zirconate. The combined mixture was held at 60° C. for an additional 2 hours and then cooled to room temperature to give 287 g of a pale yellow liquid containing 3.47% Zr.

Comparative Example E

A 500 ml flask equipped with an agitator, condenser and dropping funnel was charged with 32 g of distilled water. Agitation was started and 42.6 g of triethanolamine, 106.6 g of glycerol, 32 g of isopropyl alcohol and 9 g of boric acid were added. The resulting mixture was stirred until the boric acid dissolved. The mixture was then transferred to a clean dropping funnel. Then, a clean 500 ml flask was charged with 78 g of tetra-triethanolamine zirconate (TYZOR TEAZ organic zirconate). Agitation was started; the zirconate was heated to 60° C. The boric acid mixture was added dropwise to the zirconate. The combined mixture was held at 60° C. for an additional 2 hours and then cooled to room temperature to give 287 g of a pale yellow liquid containing 3.47% Zr.

Comparative Example F

A 500 ml flask equipped with an agitator, condenser and dropping funnel was charged with 32 g of distilled water. Agitation was started and 63.9 g of triethanolamine, 74.6 g of glycerol, 42.6 g of isopropyl alcohol and 9 g of boric acid were added. The resulting mixture was stirred until the boric acid dissolved. The mixture was then transferred to a clean dropping funnel. Then, a clean 500 ml flask was charged with 78 g of tetra-triethanolamine zirconate (TYZOR TEAZ organic zirconate). Agitation was started; the zirconate was heated to 60° C. The boric acid mixture was added dropwise to the zirconate. The combined mixture was held at 60° C. for an additional 2 hours and then cooled to room temperature to give 297 g of a pale yellow liquid containing 3.47% Zr.

Comparative Example G

A 500 ml flask equipped with an agitator, condenser and dropping funnel was charged with 21.3 g of distilled water. Agitation was started and 74.6 g of triethanolamine, 74.6 g of glycerol, 42.6 g of isopropyl alcohol and 9 g of boric acid were added. The resulting mixture was stirred until the boric acid dissolved. The mixture was then transferred to a clean dropping funnel. Then, a clean 500 ml flask was charged with 78 g of tetra-triethanolamine zirconate (TYZOR TEAZ organic zirconate). Agitation was started; the zirconate was heated to 60° C. The boric acid mixture was added dropwise to the zirconate. The combined mixture was held at 60° C. for an additional 2 hours and then cooled to room temperature to give 293 g of a pale yellow liquid containing 3.47% Zr.

Comparative Example H

A 500 ml flask equipped with an agitator, condenser and dropping funnel was charged with 32 g of distilled water. Agitation was started and 53.3 g of triethanolamine, 85.2 g of glycerol, 42.6 g of isopropyl alcohol and 9 g of boric acid were added. The resulting mixture was stirred until the boric acid dissolved. The mixture was then transferred to a clean dropping funnel. Then, a clean 500 ml flask was charged with 78 g of tetra-triethanolamine zirconate (TYZOR TEAZ organic zirconate). Agitation was started; the zirconate was heated to 60° C. The boric acid mixture was added dropwise to the zirconate. The combined mixture was held at 60° C. for an additional 2 hours and then cooled to room temperature to give 297 g of a pale yellow liquid containing 3.47% Zr.

Comparative Example I

A 500 ml flask equipped with an agitator, condenser and dropping funnel was charged with 21.3 g of distilled water. Agitation was started and 63.9 g of triethanolamine, 85.2 g of glycerol, 42.6 g of isopropyl alcohol and 9 g of boric acid were added. The resulting mixture was stirred until the boric acid dissolved. The mixture was then transferred to a clean dropping funnel. Then, a clean 500 ml flask was charged with 78 g of tetra-triethanolamine zirconate (TYZOR TEAZ organic zirconate). Agitation was started; the zirconate was heated to 60° C. The boric acid mixture was added dropwise to the zirconate. The combined mixture was held at 60° C. for an additional 2 hours and then cooled to room temperature to give 293 g of a pale yellow liquid containing 3.47% Zr.

The following Comparative Example is based on the zirconium carboxylate-polyol-boron compositions disclosed in U.S. Pat. No. 5,217,632.

Comparative Example J

A 500 ml flask equipped with an agitator, condenser and dropping funnel was charged with 30 g of TYZOR 217 organic zirconate (sodium zirconium lactate) and 10 g of water. Agitation was started and 104 g of glycerol were added dropwise. Then, 38 g of boric acid was added and the reaction mixture stirred until the boric acid dissolved (1 hour). 27.7 g of 50% aqueous sodium hydroxide solution were then added and the resulting mixture was agitated an additional hour at a temperature of 50-60° C. to give 244 g of a pale yellow liquid containing 0.7% Zr and 2.8% B.

Comparative Example J had a desirable 5 minute delay in rate of cross-linking, but had very poor viscosity development and could not maintain viscosity above 100 Cp for 90 minutes.

The results for the Comparative Examples show that the compositions prepared under known formulations do not function well under the current, higher temperature test conditions desired by the oil field service companies.

The following Examples show the inventive process to prepare borozirconate solutions and their use in cross-linking compositions.

Example 1

A 500 ml flask was charged with 50 g of tetra-n-propylzirconate (TYZOR NPZ organic zirconate). Agitation was started and 33.8 g of triethanolamine were added. The resulting mixture was heated to 60° C. and held at this temperature for 2 hours. Then, a mixture of 5.5 g glycerol and 24.1 g of water was added. The resulting mixture was held at 60° C. for an additional 2 hours and then, a mixture of 14 g of boric acid and 111.3 g of methanol was added. This mixture was main-

TABLE 1

Performance of Comparative Examples (a), (b)

| Comp. Example | TEAZ, g (moles) | Boron, g (moles) | Water, g (moles) | TEA, g (moles) | Glycerol, g (moles) | IPA, g | Fann Time Max, min. | Cp @ Max. | Cp @ 90 min. |
|---|---|---|---|---|---|---|---|---|---|
| A | 78 (1) | 9 (1.27) | 32.0 (15.6) | 42.6 (2.5) | 117.2 (11.3) | 21.3 | 15 | 114 | 75 |
| B | 78 (1) | 9 (1.27) | 21.3 (10.4) | 53.3 (3.1) | 117.2 (11.3) | 21.3 | 15 | 115 | 75 |
| C | 78 (1) | 9 (1.27) | 10.7 (5.2) | 63.9 (3.8) | 117.2 (11.3) | 21.3 | 11 | 346 | 195 |
| D | 78 (1) | 9 (1.27) | 21.3 (10.4) | 42.6 (2.5) | 106.6 (10.3) | 42.6 | 14 | 138 | 85 |
| E | 78 (1) | 9 (1.27) | 32.0 (15.6) | 42.6 (2.5) | 106.6 (10.3) | 32.0 | 14 | 200 | 150 |
| F | 78 (1) | 9 (1.27) | 32.0 (15.6) | 63.9 (3.8) | 74.6 (7.2) | 42.6 | 8 | 210 | 115 |
| G | 78 (1) | 9 (1.27) | 21.3 (10.4) | 74.6 (4.4) | 74.6 (7.2) | 42.6 | 10 | 240 | 150 |
| H | 78 (1) | 9 (1.27) | 32.0 (15.6) | 53.3 (3.1) | 85.2 (8.2) | 42.6 | 9.5 | 190 | 120 |
| I | 78 (1) | 9 (1.27) | 21.3 (10.4) | 63.9 (3.8) | 85.2 (8.2) | 42.6 | 10 | 210 | 85 |
| J | (b) | (b) | (b) | (b) | (b) | (b) | 5 | 212 | 60 |

(a) The values given in moles represent the mole ratio of the component per mole of zirconium.
(b) Comparative Example J is on different composition. See the text for details.

Comparative Examples A-J were tested under typical conditions used in the oil field for fracturing high temperature wells and results are provided in Table 1. For each Comparative Example A-I, there is provided the amounts (in grams and in moles) of the added components, and a mole ratio of components water, triethanolamine, glycerol and isopropanol on a per molar basis of zirconium.

In Tables 1 and 2, the abbreviations and headings indicate the following. TEAZ refers to TYZOR TEAZ organic zirconate; NPZ to TYZOR NPZ organic zirconate; TEA to triethanolamine; and IPA to isopropyl alcohol. "Fann Time Max, min." means the time, in minutes, it takes to reach maximum viscosity. The viscosity at this maximum time is labeled "Cp@ Max.", to indicate viscosity in centipoise (Cp). The viscosity after 90 minutes at the test temperature is labeled "Cp@ 90 min."

The data in Table 1 shows that under these testing conditions, all of the Comparative Examples cross-linked at much too slow a rate (>8 minutes) and/or generated insufficient viscosity (<200 Cp) to allow successful completion of the fracturing operation.

tained for another 2 hours at 60° C. and then cooled to room temperature to give 232 g of a pale yellow liquid containing 4.3% Zr.

Example 2

A 500 ml flask was charged with 50 g of tetra-n-propylzirconate (TYZOR NPZ organic zirconate). Agitation was started and 67.7 g of triethanolamine were added. The resulting mixture was heated to 60° C. and held at this temperature for 2 hours. Then, a mixture of 5.5 g glycerol and 6.1 g of water was added. The resulting mixture was held at 60° C. for an additional 2 hours and then, a mixture of 14 g of boric acid and 111.3 g of methanol was added. This mixture was maintained for another 2 hours at 60° C. and then cooled to room temperature to give 247 g of a pale yellow liquid containing 4.1% Zr.

Example 3

A 500 ml flask was charged with 50 g of tetra-n-propylzirconate (TYZOR NPZ organic zirconate). Agitation was started and 67.5 g of triethanolamine were added. The resulting mixture was heated to 60° C. and held at this temperature for 2 hours. Then, a mixture of 5.5 g glycerol and 24.1 g of water was added. The resulting mixture was held at 60° C. for an additional 2 hours and then, a mixture of 14 g of boric acid and 111.3 g of methanol was added. This mixture was maintained for another 2 hours at 60° C. and then cooled to room temperature to give 268 g of a pale yellow liquid containing 3.8% Zr.

Example 4

A 500 ml flask was charged with 50 g of tetra-n-propylzirconate (TYZOR NPZ organic zirconate). Agitation was started and 67.5 g of triethanolamine were added. The resulting mixture was heated to 60° C. and held at this temperature for 2 hours. Then, a mixture of 11 g glycerol and 24.1 g of water was added. The resulting mixture was held at 60° C. for an additional 2 hours and then, a mixture of 28 g of boric acid and 91.8 g of methanol was added. This mixture was maintained for another 2 hours at 60° C. and then cooled to room temperature to give 266 g of a pale yellow liquid containing 3.8% Zr.

Example 5

A 500 ml flask was charged with 100 g of tetra-n-propylzirconate (TYZOR NPZ organic zirconate). Agitation was started and 290.8 g of triethanolamine were added. The resulting mixture was heated to 60° C. and held at this temperature for 2 hours. Then, a mixture of 0.5 g glycerol and 48.2 g of water was added. The resulting mixture was held at 60° C. for an additional 2 hours and then, a mixture of 7 g of boric acid and 98.2 g of methanol was added. This mixture was maintained for another 2 hours at 60° C. and then cooled to room temperature to give 439 g of a pale yellow liquid containing 4.71% Zr.

Example 6

A 500 ml flask was charged with 50 g of tetra-n-propylzirconate (TYZOR NPZ organic zirconate). Agitation was started and 145.6 g of triethanolamine were added. The resulting mixture was heated to 60° C. and held at this temperature for 2 hours. Then, a mixture of 0.25 g glycerol and 24.1 g of water was added. The resulting mixture was held at 60° C. for an additional 2 hours and then, a mixture of 28 g of boric acid and 77.2 g of methanol was added. This mixture was maintained for another 2 hours at 60° C. and then cooled to room temperature to give 325 g of a pale yellow liquid containing 3.2% Zr.

Example 7

A 500 ml flask was charged with 50 g of tetra-n-propylzirconate (TYZOR NPZ organic zirconate). Agitation was started and 145.2 g of triethanolamine were added. The resulting mixture was heated to 60° C. and held at this temperature for 2 hours. Then, a mixture of 5.2 g glycerol and 24.1 g of water was added. The resulting mixture was held at 60° C. for an additional 2 hours and then, a mixture of 14 g of boric acid and 33.8 g of methanol was added. This mixture was maintained for another 2 hours at 60° C. and then cooled to room temperature to give 272 g of a pale yellow liquid containing 3.8% Zr.

Example 8

A 500 ml flask was charged with 50 g of tetra-n-propylzirconate (TYZOR NPZ organic zirconate). Agitation was started and 145.2 g of triethanolamine were added. The resulting mixture was heated to 60° C. and held at this temperature for 2 hours. Then, a mixture of 5.2 g glycerol and 24.1 g of water was added. The resulting mixture was held at 60° C. for an additional 2 hours and then, a mixture of 28 g of boric acid and 24.1 g of methanol was added. This mixture was maintained for another 2 hours at 60° C. and then cooled to room temperature to give 276 g of a pale yellow liquid containing 3.75% Zr.

TABLE 2

Performance of Inventive Examples (a)

| Example | % Zr | NPZ, g (moles) | TEA, g (moles) | Glycerol, g (moles) | Water, g (moles) | Boron, g (moles) | Methanol, g | Fann Time Max, min. | Cp @ Max. | Cp @ 90 min. |
|---|---|---|---|---|---|---|---|---|---|---|
| Example 1 | 4.3 | 50 (1) | 33.8 (2) | 5.5 (0.5) | 24.1 (11.8) | 14 (2) | 111.3 | 6.5 | 480 | 280 |
| Example 2 | 4.1 | 50 (1) | 67.7 (4) | 5.5 (0.5) | 6 (3) | 14 (2) | 111.3 | 7 | 612 | 378 |
| Example 3 | 3.8 | 50 (1) | 67.7 (4) | 5.5 (0.5) | 24.1 (11.8) | 14 (2) | 111.3 | 7 | 620 | 485 |
| Example 4 | 3.8 | 50 (1) | 67.7 (4) | 11 (1) | 24.1 (11.8) | 28 (4) | 91.8 | 8 | 340 | 230 |
| Example 5 | 3.8 | 100 (1) | 290.8 (8.6) | 0.5 (0.024) | 48.2 (11.8) | 7 (0.5) | 98.2 | 5 | 1200 | 630 |
| Example 6 | 3.2 | 50 (1) | 145.4 (8.6) | 0.25 (0.024) | 24.1 (11.8) | 28 (4) | 77.2 | 8 | 925 | 510 |
| Example 7 | 3.8 | 50 (1) | 145.2 (8.6) | 5.2 (0.52) | 24.1 (11.8) | 14 (2) | 33.8 | 6 | 990 | 560 |
| Example 8 | 3.8 | 50 (1) | 145.2 (8.6) | 5.2 (0.52) | 24.1 (11.8) | 28 (4) | 24.1 | 7.5 | 990 | 550 |

(a) The values given in moles represent the mole ratio of the component per mole of zirconium.

The cross-linkers produced according to the process of the invention were tested under identical conditions to those of the Comparative Examples. Table 2 shows that the cross-linkers of this invention cross-link in the desirable 3-8 minute range and generate significantly higher viscosities than the Comparative Examples and retain that viscosity long enough to allow successful completion of the fracturing operation, that is, maintained viscosity of >200 Cp, most Examples, even greater than 300 Cp after 90 minutes.

Based on these observations, the cross-linking compositions of this invention perform better than those of the Comparative Examples under the higher temperature test conditions as desired by the oil field service companies. In addition, each of the Examples was stable upon storage for at least 6 months.

What is claimed is:

1. A process to prepare a solution of borozirconate complex, which solution is suitable for use in a cross-linking composition which comprises:
(a) contacting a zirconium complex with alkanolamine at a mole ratio of 1 to 10 moles of alkanolamine to zirconium in an alcohol to form a first mixture; (b) contacting the first mixture with glycerol and water at a mole ratio of about 0.1 to 1 moles of glycerol per mole of zirconium and a mole ratio of about 1 to 12 moles of water per mole of zirconium, to produce a second mixture; (c) contacting the second mixture with a boron compound at a mole ratio of about 1 to 6 moles of boron per mole of zirconium and at a temperature of 25° C. to 90° C. to produce a solution comprising a borozirconate complex.

2. The process of claim 1 wherein the zirconium complex is a tetraalkyl zirconate selected from the group consisting of tetra-isopropyl zirconate, tetra-n-propyl zirconate, and tetra-n-butyl zirconate.

3. The process of claim 2 wherein the alkanolamine is selected from the group consisting of triethanolamine, tripropanolamine, tri-isopropanolamine, diisopropanolamine, and mixtures of two or more thereof.

4. The process of claim 3 wherein the boron compound is selected from the group consisting of boric acid, alkali metal borates, alkaline earth metal borates, and polymeric borate compounds.

5. The process of claim 4 wherein the boron compound is boric acid.

6. A cross-linking composition which comprises (a) an aqueous liquid; (b) a pH buffer; (c) a cross-linkable organic polymer; and (d) a borozirconate solution prepared by a process which comprises: (1) contacting a zirconium complex with triethanolamine at a mole ratio of 1 to 10 moles of triethanolamine to zirconium in an alcohol to form a first mixture; (2) contacting the first mixture with glycerol and water at a mole ratio of about 0.1 to 1 moles of glycerol per mole of zirconium and a mole ratio of about 1 to 12 moles of water per mole of zirconium, to produce a second mixture; (3) contacting the second mixture with a boron compound at a mole ratio of about 1 to 6 moles of boron per mole of zirconium and at a temperature of 25° C. to 90° C. to produce a solution comprising a borozirconate complex.

7. The composition of claim 6 wherein the aqueous liquid is water, aqueous methanol, aqueous ethanol, an aqueous solution of potassium chloride, an aqueous solution of tetramethylammonium chloride, or a combination of two or more thereof 8. The composition of claim 7 wherein the organic polymer is a solvatable polysaccharide and is selected from the group consisting of gums, gum derivatives and cellulose derivatives.

9. The composition of claim 8 wherein the organic polymer is hydroxyethylguar, hydroxypropylguar, carboxyethylhydroxyethylguar, carboxymethylhydroxypropylguar, carboxymethyl guar, carboxymethylcellulose or carboxymethylhydroxyethylcellulose.

10. The composition of claim 6 wherein the aqueous liquid is selected from the group consisting of water, aqueous alcohol, and aqueous solution of a clay stabilizer.

11. A method for hydraulically fracturing a subterranean formation, which comprises introducing into the formation at a flow rate and pressure sufficient to create, reopen, and/or extend one or more fractures in the formation, a cross-linking composition comprising an aqueous liquid; a pH buffer; a cross-linkable organic polymer, and a solution of a borozirconate complex wherein the solution is prepared by a process comprising (a) contacting a zirconium complex with triethanolamine at a mole ratio of 1 to 10 moles of triethanolamine to zirconium in an alcohol to form a first mixture; (b) contacting the first mixture with glycerol and water at a mole ratio of about 0.1 to 1 moles of glycerol per mole of zirconium and a mole ratio of about 1 to 12 moles of water per mole of zirconium, to produce a second mixture; (c) contacting the second mixture with a boron compound at a mole ratio of about 1 to 6 moles of boron per mole of zirconium and at a temperature of 25° C. to 90° C. to produce a solution comprising a borozirconate complex.

12. The method of claim 11 wherein the temperature in the formation is 275-325° F. (135-163° C.).

13. The method of claim 12 wherein the solution of borozirconate complex and the cross-linkable polymer are contacted prior to their introduction into the formation.

14. The method of claim 12 wherein the subterranean formation is penetrated by a wellbore;
   a base gel is prepared by mixing the cross-linkable organic polymer with the aqueous liquid;
   the solution of borozirconate complex, the base gel, or both further comprise a pH buffer;
   the solution of borozirconate complex is contacted with the base gel in the wellbore to produce a cross-linked gel, and
   the cross-linked gel is introduced into the formation from the wellbore.

15. The method of claim 12 further comprising introducing a cross-linking composition comprising the solution of borozirconate complex, a cross-linkable organic polymer and proppant into the fracture or fractures.

16. A method for selectively plugging permeable zones and leaks in subterranean formations which comprises introducing into the permeable zone or the site of the subterranean leak, a cross-linking composition comprising (a) an aqueous liquid; (b) a pH buffer, (c) a cross-linkable organic polymer; and (d) an aqueous solution of the borozirconate complex comprising an aqueous liquid; a pH buffer; a cross-linkable organic polymer, and a solution of a borozirconate complex wherein the solution is prepared by a process comprising (a) contacting a zirconium complex with triethanolamine at a mole ratio of 1 to 10 moles of triethanolamine to zirconium in an alcohol to form a first mixture; (b) contacting the first mixture with glycerol and water at a mole ratio of about 0.1 to 1 moles of glycerol per mole of zirconium and a mole ratio of about 1 to 12 moles of water per mole of zirconium, to produce a second mixture; (c) contacting the second mixture with a boron compound at a mole ratio of about 1 to 6 moles of boron per mole of zirconium and at a temperature of 25° C. to 90° C. to produce a solution comprising a borozirconate complex.

17. The method of claim 16 wherein the temperature in the formation is 275-325° F. (135-163° C.).

* * * * *